E. T. GREENFIELD.
HOSE.
APPLICATION FILED MAY 5, 1908.
995,453.
Patented June 20, 1911.
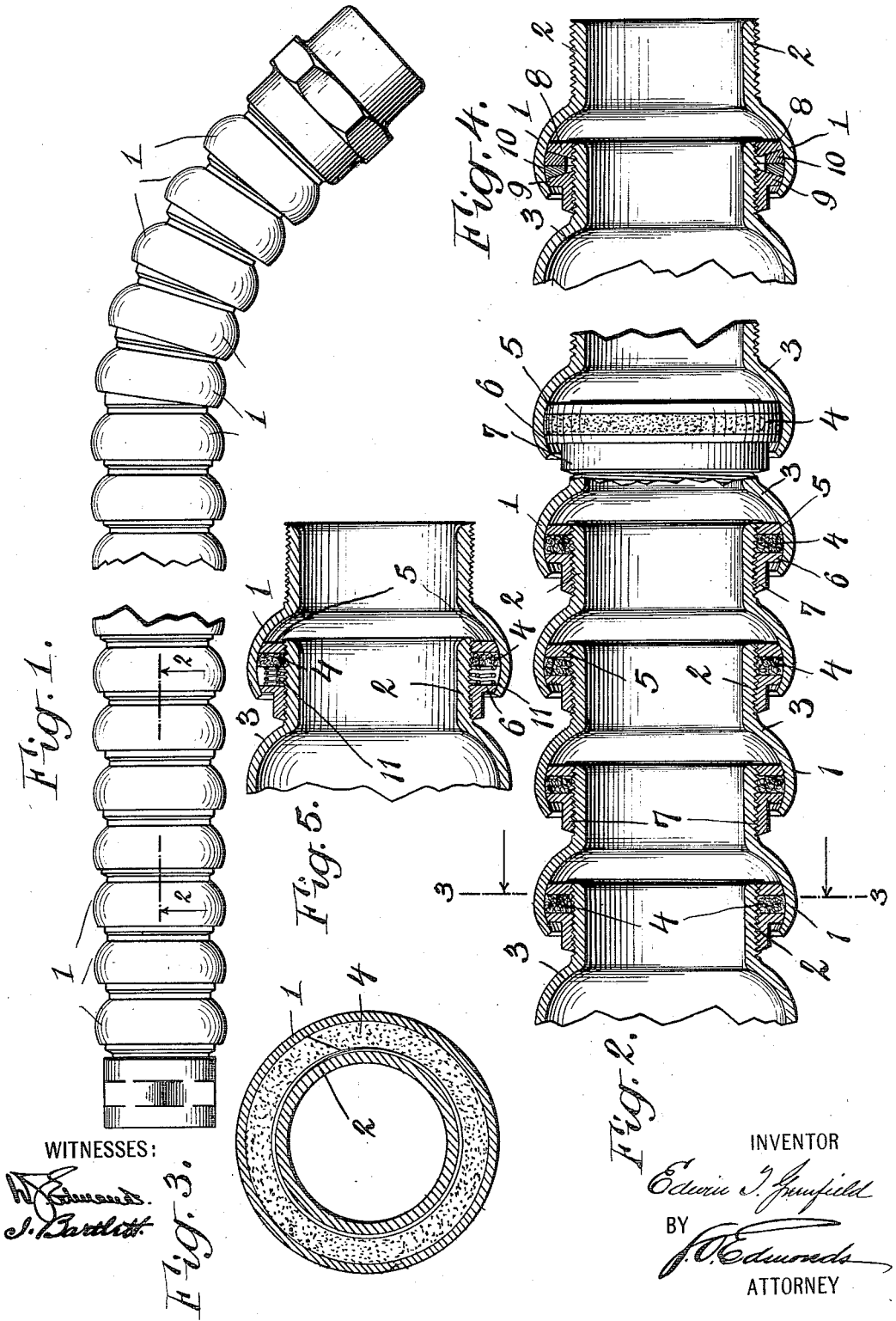
WITNESSES:
INVENTOR
BY
ATTORNEY

UNITED STATES PATENT OFFICE.

EDWIN T. GREENFIELD, OF KIAMESHA, NEW YORK.

HOSE.

995,453.                Specification of Letters Patent.    Patented June 20, 1911.

Application filed May 5, 1908. Serial No. 430,975.

*To all whom it may concern:*

Be it known that I, EDWIN T. GREENFIELD, a citizen of the United States, residing at Kiamesha, in the county of Sullivan and State of New York, have invented a certain new and useful Improvement in Hose, of which the following is a specification.

This invention relates to flexible metallic hose adapted for use in carrying water, gasolene and the like, or for carrying air or steam under pressure, its ability to withstand the strain of a fluid under pressure rendering the hose useful as an end connector for the steam or air pipe of a car of a railway train.

The invention is directed to the provision of a hose possessing great strength and ample flexibility, which can be constructed at small cost, which though flexible will carry a fluid without leakage, and which is so constructed that when the coacting parts wear to such extent that leakage would be apt to occur these parts may be tightened up to again effectually preclude leakage.

The preferred embodiment of the invention is illustrated in the accompanying drawings, in which—

Figure 1 is an elevation of the hose, Fig. 2 is a longitudinal section on line 2—2 of Fig. 1, Fig. 3 is a transverse section on line 3—3 of Fig. 2, and Figs. 4 and 5 are sectional detail views illustrating modifications.

Referring first to Figs. 1, 2 and 3, the hose consists of a plurality of tubular pieces, each of which has one end extending within the end of the next adjacent piece and movable relatively to but interlocked with that piece. Each of the tubular pieces has a portion 1 at one end which is of larger diameter than the portion 2 at the other end, the two parts of different diameters being connected by a wall 3 integral therewith. The portion 1 of each piece is convexly curved about a point in the axis of the piece. The exterior surface of the portion 2 of each piece is threaded. On the portion 2 of each tubular piece is a gasket consisting of a ring 4 of compressible material, such as asbestos, vulcabeston or the like, and on either side thereof, rings 5 and 6 of metal. The ring 5 is a thin washer, interiorly threaded, and is positioned upon the extreme end of the tubular piece with its threads engaging those of the portion 2. The compressible gasket 4 may be split, as shown in Fig. 3. The ring 6 is also interiorly threaded, and its threads engage those of the portion 2. This ring, instead of being a flat washer like the ring 5, is provided with an integral wall 7 extending in the direction of the axis of the piece and of such width that its end projects beyond the end of the overlying convexly-curved portion 1 of the next tubular piece. This end of the wall 7 may be formed to facilitate gripping it with a pipe wrench.

The parts are assembled by positioning the three rings of a gasket upon the portion 2 of each tubular piece, with the ring 6 in such position that the ring 4 is not compressed between the rings 6 and 5, and the portion 2 of one piece with the gasket thereon is inserted within the convexly-curved portion 1 of another piece. Then, by means of a wrench, the ring 6 is turned upon the threaded portion 2 to cause it to move toward the ring 5 until the ring 4 is compressed between the rings 5 and 6 to such extent that it is forced outwardly into hard contact with the interior surface of the convexly-curved portion 1 overlying the same. Any suitable number of tubular pieces is assembled in this manner. The hose thus constructed possesses ample flexibility, as any two adjacent pieces can turn relatively a considerable amount, the gasket of one piece moving around upon the interior surface of the convexly-curved portion of the adjacent piece. Leakage at the joints between the pieces is prevented, however, as the compressible gasket 4 is pressed outwardly into hard contact with the overlaying portion of the next piece.

It will be understood that in tightening up the ring 6, ring 5 does not move on the portion 2; ring 5 is locked upon the portion 2 to prevent its rotation thereon, as by turning up the end of the portion 2 to rivet ring 5 thereon. If after a long period of use the ring 4 of the gasket wears away to such extent that leakage occurs at a joint, it is only necessary to apply a wrench to the wall 7 of the ring 6 and turn this ring in a direction to move it toward the ring 5, whereby the ring 4 will be expanded to an extent sufficient to compensate for the wear thereon.

In Fig. 4, I have illustrated a slight modification of the construction above described, in which the adjacent surfaces of the rings 8 and 9, corresponding to the rings 5 and 6 of Fig. 2, are inclined somewhat instead of being parallel. Between these two rings, one or more split rings 10 may be employed, the opposite faces of which are inclined to correspond to the inclination of the faces of the rings 8 and 9. The rings 10 are preferably made of a material similar to that commonly employed in packing-rings for pistons. With this construction, it will be seen that by turning ring 9 in a direction to advance it toward the ring 8, the rings 10 will be forced outwardly into hard contact with the overlying convexly-curved wall 1 by the coacting inclined faces. In this way, wear may be compensated for and leakage prevented, as in the construction illustrated in Fig. 2, but this is done by moving the rings 10 bodily outward instead of by compressing them, so as to expand them in a radial direction.

In Fig. 5, I have illustrated a further modification, in which one or more springs are employed for maintaining the compressible ring 4 under constant compression. The parts are so formed as to provide a space between the adjacent faces of the compressible ring 4 and the non-compressible ring 6, and in this space one or more spiral springs 11 are arranged bearing at one end upon the ring 4 so as to hold the latter under compression. With this construction, as the ring 4 wears away, it is expanded by the springs 11, so as to completely fill the space between the overlapping ends of the two tubular pieces, and if after a long period of use leakage does take place, the ring 6 may be tightened up upon the threaded end of the tubular piece to cause the springs to exert greater pressure upon the ring 4.

Having described my invention what I claim as new therein and desire to secure by Letters Patent of the United States is:

1. A joint consisting of two tubular members interlocked to hold them against separation, one having one end thereof convexly curved and the other having one end thereof exteriorly threaded and fitting within the curved end of the first member, a metallic ring upon said threaded end fixed against movement axially of the member, a compressible gasket on said threaded end adjacent to said ring and an interiorly threaded ring on said threaded end adapted to be turned on the member to compress the gasket between it and said first-named ring, both of said rings underlying in part said convexly curved portion and one of the rings having a part extending beyond the end of said convexly curved portion, substantially as set forth.

2. A joint consisting of two tubular members interlocked against separation, one having one end thereof convexly curved and the other having one end thereof exteriorly threaded and fitting within the curved end of the first member, a metallic ring upon said threaded end fixed against movement axially of the member, a compressible gasket on said threaded end adjacent to said ring, and an interiorly threaded ring on said threaded end adapted to be turned on the member to compress the gasket between it and said first-named ring, and a spring between one of said rings and said gasket, both of said rings underlying in part said convexly curved portion, and one of the rings having a part extending beyond the end of said convexly curved portion, substantially as set forth.

This specification signed and witnessed this 4th day of May, 1908.

EDWIN T. GREENFIELD.

Witnesses:
S. O. EDMONDS,
D. J. EDMONDS.